(12) United States Patent
Elliott

(10) Patent No.: US 8,956,197 B1
(45) Date of Patent: Feb. 17, 2015

(54) FOOT ACTIVATED DEER RATTLING DEVICE

(71) Applicant: Deane Owen Elliott, Woodbridge, VA (US)

(72) Inventor: Deane Owen Elliott, Woodbridge, VA (US)

(*) Notice: Subject to any disclaimer, the term of this patent is extended or adjusted under 35 U.S.C. 154(b) by 0 days.

(21) Appl. No.: 14/062,662

(22) Filed: Oct. 24, 2013

Related U.S. Application Data

(60) Provisional application No. 61/717,658, filed on Oct. 24, 2012.

(51) Int. Cl.
  *A63H 5/00* (2006.01)
  *A01M 31/04* (2006.01)
(52) U.S. Cl.
  CPC ..................................... *A01M 31/04* (2013.01)
  USPC ....................................................... 446/397
(58) Field of Classification Search
  USPC .................. 446/397, 402, 404, 418, 421, 422
  See application file for complete search history.

(56) References Cited

U.S. PATENT DOCUMENTS

| | | | |
|---|---|---|---|
| 3,757,466 A * | 9/1973 | Strelakos | 446/26 |
| 4,955,845 A * | 9/1990 | Piper | 446/397 |
| 5,019,008 A * | 5/1991 | Hughes | 446/207 |
| 5,334,074 A * | 8/1994 | Suminski | 446/418 |
| 5,402,102 A * | 3/1995 | Lachance | 340/404.1 |
| 5,503,585 A * | 4/1996 | Heineman | 446/397 |
| 5,555,664 A | 9/1996 | Shockley | |
| 6,003,261 A * | 12/1999 | French | 43/1 |
| 6,042,452 A | 3/2000 | Niebrugge | |
| 6,289,626 B1 | 9/2001 | Williams | |
| 6,312,309 B1 | 11/2001 | Ocwieja | |
| 6,889,466 B1 | 5/2005 | Hamlet | |
| 7,281,966 B2 * | 10/2007 | McQueen | 446/421 |
| 8,607,496 B2 * | 12/2013 | Zampetis et al. | 43/1 |
| 2012/0196504 A1 | 8/2012 | Wtorkiewicz, Jr. | |

* cited by examiner

*Primary Examiner* — Kurt Fernstrom
(74) *Attorney, Agent, or Firm* — Andrew D. Mead

(57) ABSTRACT

A foot-operated antler rattling simulator device having a base and a moveable pedal moving a pair of sound plates having a plurality of protuberances extending therefrom to simulate the sound of antlers smashing together and rattling while engaged. The sound plates are selectively removable to tailor the antler sound to specific species of antlered animals. An optional embodiment includes a deer grunt, also actuated by the foot apparatus independent of operation of the antler rattle, allowing a hunter to simulate antler noises and grunting of two bucks fighting.

20 Claims, 5 Drawing Sheets

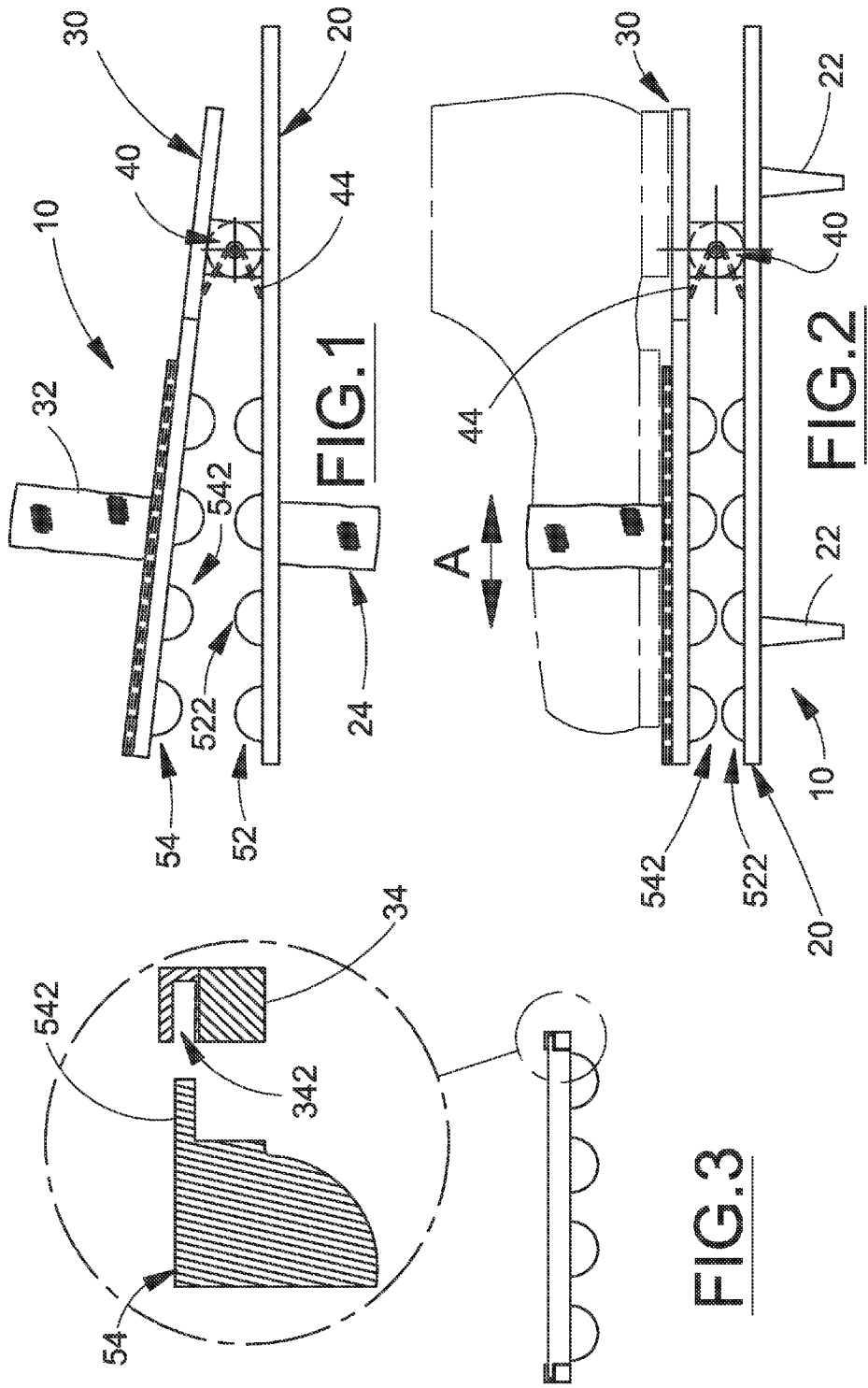

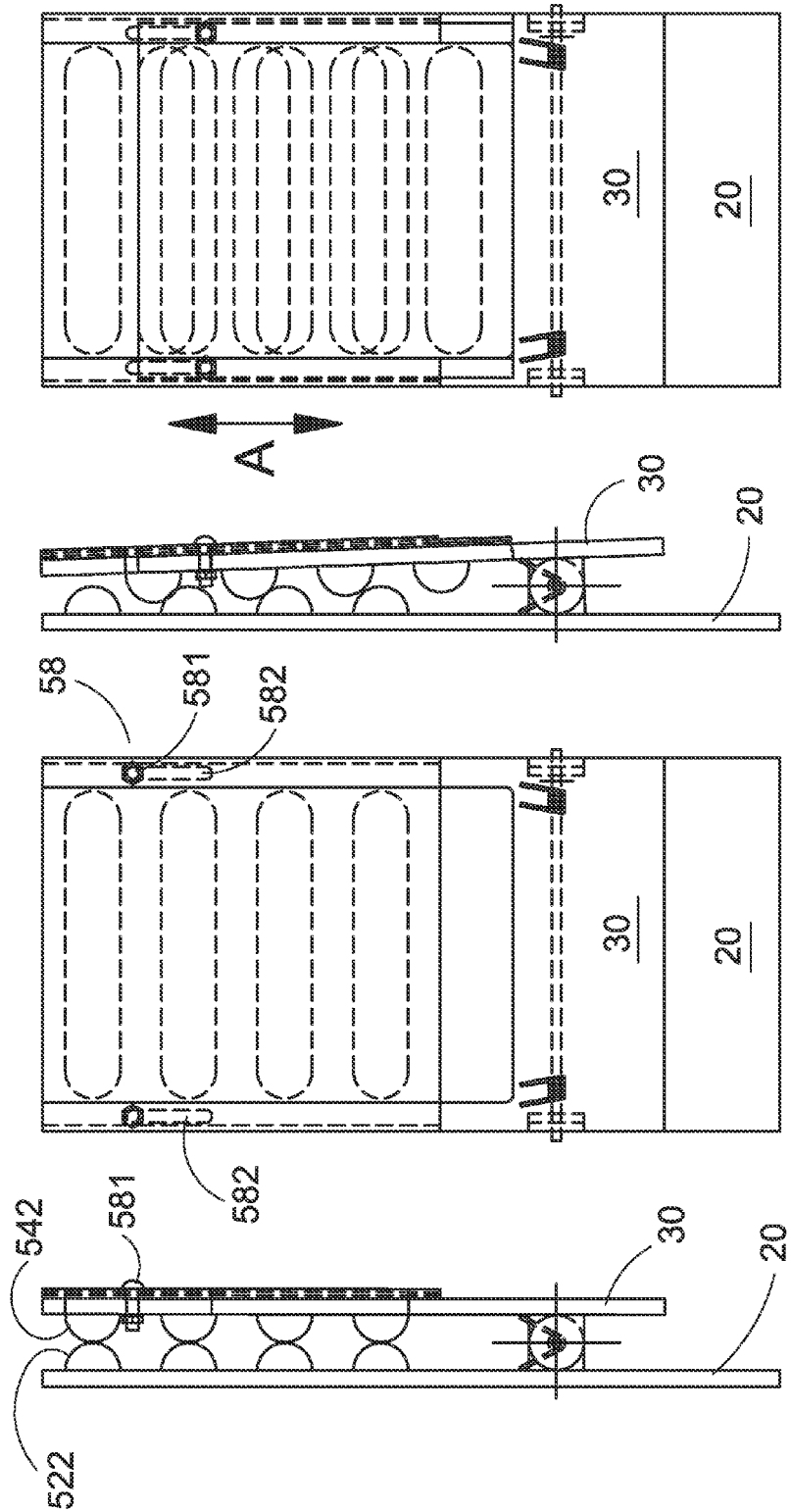

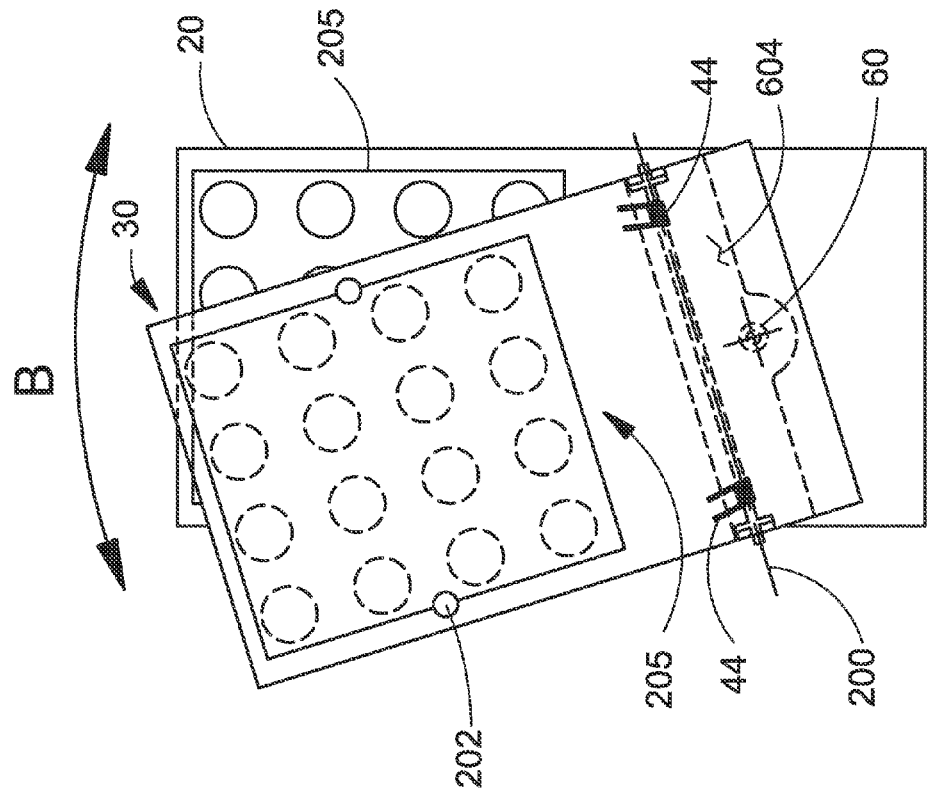
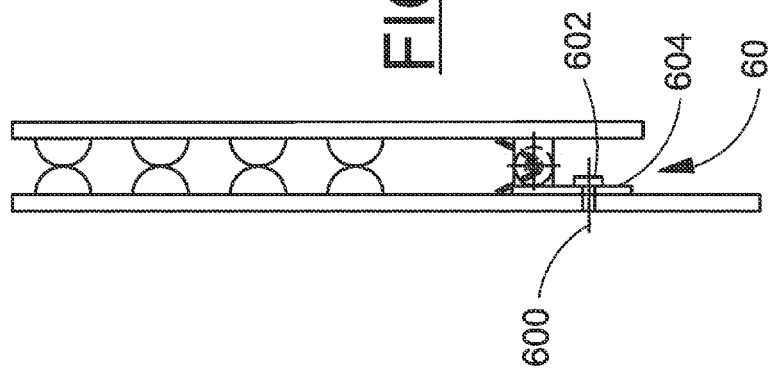

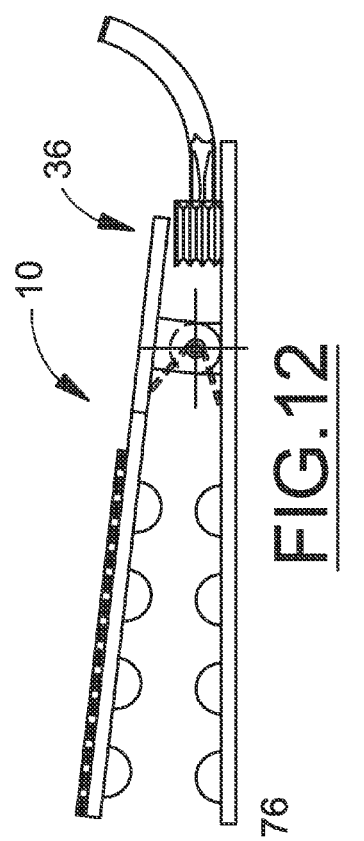
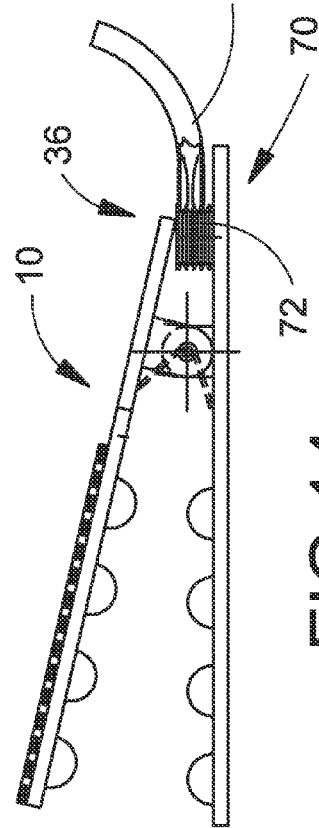
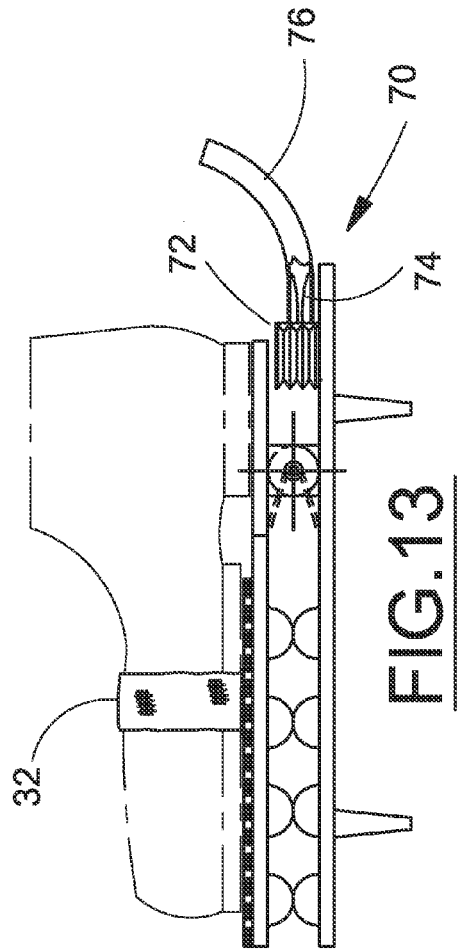

FOOT ACTIVATED DEER RATTLING DEVICE

CROSS REFERENCE TO RELATED APPLICATIONS

This application claims the benefit of priority to U.S. Provisional Patent Application entitled "FOOT ACTIVATED DEER RATTLING DEVICE", Ser. No. 61/717,658, filed on Oct. 24, 2012.

BACKGROUND OF THE INVENTION

This invention relates generally to devices for attracting animals, and more particularly to a foot activated device for simulating deer antler rattling for use by hunters.

When hunting deer during the rut or mating season, it is desirable to create a sound that simulates two male deer (bucks) sparring or fighting in the woods. When the bucks fight over dominance, they interlock their antlers and push on each other. This sound can be heard throughout the woods by other bucks and they are attracted to the sounds, oftentimes to participate in fighting over the right to breed the female deer (doe). There are generally two types of sounds that occur during the fight. One sound is the "smashing" together of the antlers when the two deer engage one another. The other sound is a "rattling" sound that is produced when the bucks twist the interlocked antlers.

In order to simulate these sounds, hunters often carry two antlers that have been shed by the deer late in the season. Also, there are several types of simulated rattles on the market that include a bag full of simulated antlers that is smashed and rolled in the hands of the hunter. Another product is comprised of two round plates that are smashed together by the hunter and may be twisted so that round knobs on the plates can simulate the "rattling" sound.

One of the primary drawbacks of the above types of rattling devices is that they require the use of both hands of the hunter. Since the hunter is moving his hands, he becomes very visible when rattling. Additionally, the bucks that respond to these situations often appear very quickly and are running towards the action. This does not leave much time for the hunter to set down his rattles in order to pick up his bow or firearm.

It would be beneficial to provide an antler rattling device capable of producing both a "smashing" and a "rattling" sound that does not require the use of hands to operate. Additional benefits would be realized by an antler rattling device that provides interchangeable sound making portions so that the device can simulate different antlered species sounds. Still further benefits would be realized by the incorporation of additional lure sounds, such as a grunt, operable using the same hands-free apparatus as the antler rattling device.

SUMMARY OF THE INVENTION

Accordingly, the present invention, in any of the embodiments described herein, may provide one or more of the following advantages:

It is an object of the present invention to provide a foot-operated antler rattling device including a moveable foot pedal connected to a base member. The foot pedal is spring biased into a position separating the adjacent surfaces of the foot pedal and base member. Sound generating surfaces are attached to the base member and foot pedal in opposition on the adjacent surfaces. Depressing the foot pedal sharply brings the opposing sound generating surfaces into contact, creating a first call sound known as "smashing." The foot pedal further includes a moveable portion that allows its attached sound generating surface to move laterally in relation to the base member mounted sound generating surface to produce a second call sound known as "rattling." Lateral movement may be caused by longitudinal movement of the foot pedal or by pivoting about a generally upstanding axis.

It is another object of the present invention to provide a foot-operated antler rattling device that offers interchangeable sound generating surfaces so the device may be tailored to simulate different antlered species, such as deer, elk, or moose. The device includes moveable foot pedal connected to a base member, each having a receptacle for receiving a sound generating surface member and securing it for operation of the device. Variations in the configuration, surface texture, and material of construction of the sound generating surface members allow the sounds to be tailored to suit a specific species. The receptacles enable the sound generating surfaces to be easily swapped depending upon the quarry to be called.

Yet another object of the present invention is to provide a foot-operated antler rattling device that may include an additional sound-generating apparatus for use in conjunction with the antler rattling apparatus. A moveable foot pedal pivotable about a neutral position in generally opposing directions enables antler rattling by depressing the pedal in a first direction and engagement of a second animal call sound generator when depressed in the opposite direction. A spring biases the pedal toward the neutral position at which point neither sound generating apparatus is engaged. In one embodiment, the second animal call sound generator is a pneumatic reed, commonly known as a deer grunt.

It is still another object of the present invention to provide a foot-operated antler rattling device that is durable in construction, inexpensive of manufacture, carefree of maintenance, easily assembled, and simple and effective to use.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is an elevation view of a foot-operated animal call incorporating a first embodiment of the present invention, shown in a first position;

FIG. 2 is an elevation view of the a foot-operated animal call of FIG. 1 shown in a second position for producing an animal call sound;

FIG. 3 is a detail view of a first embodiment of a movement mechanism for one of the sound generating surfaces in the animal call;

FIGS. 6-8 illustrate a second embodiment of a sound generating surface useful in the foot-operated animal call device and a second movement mode for producing a second call sound from the sound generating surfaces;

FIGS. 9 and 10 illustrate an alternate embodiment of a movement mechanism for one of the sound generating surfaces in the animal call; and FIGS. 11 through 14 illustrate the inclusion of a second animal call sound generating device in the foot-operated antler rattling device.

DESCRIPTION OF THE PREFERRED EMBODIMENT(S)

Figure 5:
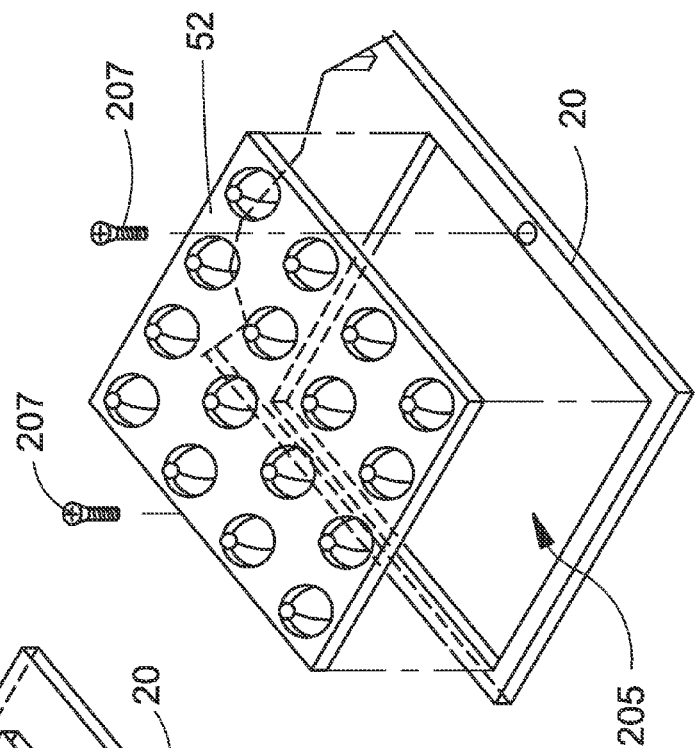
FIG. 5 is a detail of the animal call of FIG. 4 illustrating one embodiment of a selectively removable sound generating surface.
Figure 4:
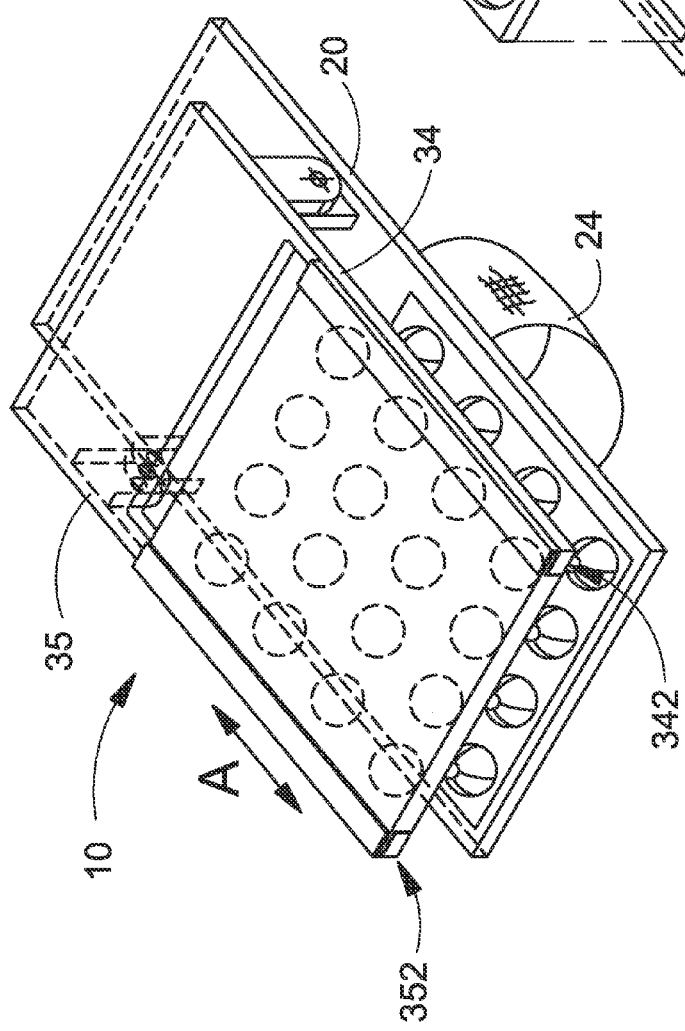
FIG. 4 is a perspective view of the foot-operated animal call shown in FIGS. 1 and 2.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience, and are determined from a vantage on level ground. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring to the figures, particularly FIGS. 1 through 4, a first embodiment of a foot-operated antler rattling device 10 useful by hunters for attracting deer and other antlered species is shown. The rattling device comprises a base portion 20 and moveable pedal portion 30 connected to the base portion by a moveable connection 40 allowing the pedal portion 30 to move relative to the base portion 20. The base portion may include anchor members 22 for restraining the base portion 20 in a fixed location on the ground or a strap anchor 24 for securing the base portion to a platform, such as a tree stand.

A pair of sound generating panels 52, 54 are provided, one connected to each of the base and pedal portions 20, 30, respectively. Each sound generating panel 52, 54 includes one or more protuberances 522, 542 unidirectionally projecting from the surface of the panels and oriented in general opposition when the panels are installed in the device 10. Protuberances 522 connected to the base portion 20 are generally upwardly oriented while protuberances 524, connected to the pedal portion 30, are oriented generally downwardly. The protuberances 522, 524 may be formed from a variety of materials, natural (antler) or synthetic (e.g., plastic), with the size, shape, and spacing of the protuberances established to produce the desired sounds using known technology.

As illustrated in FIG. 5, the sound generating panels may be configured to be selectively removable from the base and pedal portions to enable sound generating panels having different sound producing characteristics to be used in the device. One such method is the inclusion of a receptacle 205 in the base 20 or pedal portion 30 into which a panel 52, 54 may be inserted and restrained for operation using known fastening means. The receptacle 205 is configured to restrain the respective panel in position once inserted and fastened so that the panels move in unison with the respective base and pedal portions. An exemplar receptacle is a rabbit-style joint which, when used with a fastener 207, is capable of restraining the panel in three orthogonal directions.

A first antler sound is produced by rapidly depressing the pedal portion 30 so that the opposing protuberances 522, 524 come into contact (FIG. 2). This sound is called "smashing" and is similar to that produced when two bucks butt their respective antler racks together. Moveable connection 40 preferably includes a spring 44 to bias the position of the pedal portion 30 to a neutral position in which the protuberances 522, 524 are not in contact, shown in FIG. 1, allowing the "smashing" sound to be easily repeated to better simulate the sound of two bucks fighting.

A second antler sound is produced by moving the one of the sound generating panels, the upper panel 54 in the illustration, in relation to the lower panel 52 while the protuberances are generally in contact as shown in FIG. 2 and also in FIGS. 6 through 9. This sound is called "rattling" and simulates the sound of two buck having their respective antler racks intertwined as they struggle for dominance. A first embodiment of the pedal portion 30 includes a frame defined by a pair of spaced-apart side members 34, 35, each having a longitudinally oriented channel 342, 352 disposed therein. The upper sound generating panel 54 is provided with a pair of opposing tangs 544 to engage the channels 342, 352 to restrain the panel 54 perpendicularly to the channels while allowing longitudinal movement as shown by directional arrow "A" in the figures. Alternatively, a separate sliding frame member may be provided with tangs 544 to engage the channels 342, 352 and a receptacle, as discussed heretofore in associated with FIG. 5, for receiving the upper sound generating panel 54. A travel limiter 58 comprising a bolt 581 engaging a slot 582 may be incorporated to limit the fore-aft movement of the upper sound generating panel 54 in the pedal portion 30 frame. A stirrup 32 and/or a high-friction surface provided on the upward facing surface of the upper sound generating panel 54 allows the user to engage the panel 54 with a foot and slide the panel fore and aft while the pedal portion is depressed so that the opposing protuberances slide across one another to produce the "rattling" sound.

A second embodiment for producing the "rattling" sound is illustrated in FIGS. 10 and 11. In this embodiment, a generally upstanding pivot mechanism 60 is provided generally adjacent to the moveable connection 40. The moveable connection 40 enables the pedal portion to pivot about a generally horizontal first pivot axis 200 so that the "smashing" sound can be produced. In one embodiment, the pivot mechanism 60 comprises a pivot pin 602 and a pivot base 604 to which the moveable connection 40 and the connected pedal portion 30 to pivot about the upstanding second pivot axis 600. As the pedal portion 30 is moved in either arc direction (see arrow "B" in FIG. 10) while the pedal portion is depressed so the protuberances 522, 524 are in contact, the lateral relative movement of the protuberances produces the "rattle" sound.

The foot-operated antler rattling device 10 may also be provided with a second sound generating device 70 for use with the antler rattling described heretofore. In the embodiment illustrated in FIGS. 12 through 14, the sound generating device 70 includes a pneumatic reed apparatus, commonly referred to as a deer grunt. The device 70 includes a bellows 72 or the like to produce an air flow when compressed or expanded. The airflow is directed through a tube 76 containing a reed 74. It is known to provide an adjustable reed so that the sound of a buck, a doe, or a fawn may be simulated. In the presently described device, a buck grunt is most likely to be employed for use in conjunction with antler rattling sounds. As the bellows 72 is compressed or expanded, air flowing through the tube 76 causes the reed 74 to vibrate, producing a grunting sound as is well known. Movement of the bellows is accomplished by pivoting the pedal portion 30 in a direction opposite to that required to produce antler sounds. A rearward extension 36 of the pedal portion 30 acts upon and compress the bellows (see FIG. 14) as the pedal portion 30 is pivoted rearwardly. Releasing the rearward pedal pressure allows the spring 44, biased toward a neutral pedal position (see FIG. 12), to move the pedal portion and decompress the bellows 72. The neutral position of the pedal portion is configured so that neither the antler sound generating panels 52, 54 nor the second sound generating device 70 is engaged and that selective movement of the pedal portion activates only one sound producing apparatus at a time depending upon the direction the pedal portion is pivoted. This enables a hunter to produce a single desired animal call sound or a series of antler sounds and grunt sounds believed to lure the target animal.

The bellow 72 may also be in the form of a flexible bladder as is used in many types of known deer grunts. Other forms of sound generators which produce sounds based on changes in relative positions of two structural elements may also be used.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A foot-operated antler rattling apparatus comprising:
   a base portion and a moveable pedal portion connected thereto;
   a first sound plate having first plurality of protuberances projecting generally in a first direction therefrom, the first sound plate being connected to the base portion; and
   a second sound plate having a second plurality of protuberances projecting generally in a second direction from the second sound plate, the second sound plate being connected to the pedal portion;
   the base and pedal portions configured for a first movement enabling the first plurality of protuberances to be moved into and out of contact with the second plurality of protuberances as the pedal portion is moved between first position and a neutral position, respectively, and a second movement enabling the first plurality of protuberances to be moved relative to the second plurality of protuberances while in contact therewith.

2. The foot-operated antler rattling apparatus of claim 1, further comprising a biasing element positioning the base portion and pedal portion to maintain the first and second plurality of protuberances spaced apart.

3. The foot-operated antler rattling apparatus of claim 2, wherein the base portion and the pedal portion are hingedly connected.

4. The foot-operated antler rattling apparatus of claim 3, further comprising a moveable frame connected to the pedal portion, the moveable frame enabling movement in generally opposing directions along a slide axis, the second sound plate being connected to the moveable frame for movement therewith.

5. The foot-operated antler rattling apparatus of claim 4, wherein the slide axis is generally perpendicularly oriented to the hinge.

6. The antler rattling apparatus of claim 5, further comprising a stirrup connected to the moveable frame for engagement by a user to move the pedal portion.

7. The antler rattling apparatus of claim 3, further comprising a pivot connection arranged to permit the hinged connection between the base portion and the pedal portion to also be pivoted about a generally upstanding pivot axis.

8. The antler rattling apparatus of claim 7, further comprising a stirrup connected to the pedal portion for engagement by a user to move the pedal portion.

9. The antler rattling apparatus of claim 1, wherein the base portion and pedal portion each include a receptacle for receiving respective first and second sound plates enabling the first and second sound plates to be selectively removed.

10. The antler rattling apparatus of claim 1, further comprising an anchor for securing the base portion in a stationary position.

11. The antler rattling apparatus of claim 1, wherein the moveable portion is biased to a neutral position and configured for movement in generally opposing first and second directions about the neutral position, movement in the first direction from the neutral position actuating the antler rattling apparatus, movement in the second direction from the neutral position actuating a second animal call.

12. The antler rattling apparatus of claim 11, wherein the second animal call is a deer grunt.

13. A foot-operated animal call comprising:
    a fixed base portion and a moveable pedal portion connected thereto, the moveable pedal portion being moveable relative to the fixed base portion in at least two movement modes;
    a first sound generating surface attached to the fixed portion; and
    a second sound generating surface attached to the moveable portion and positioned in opposition the first sound generating surface;
    the base and pedal portions being configured to move in a first movement mode between a contact and a non-contact position, the first and second sound generating surfaces being spaced apart when the in the non-contact position and being in adjacent contact with in the contact position, movement from the non-contact to the contact position causing a first call sound;
    the base and pedal portions being configured to move in a second movement mode between generally opposing first and second positions, movement between the first and second positions causing a second call sound when the first and second sound generating surfaces are in the contact position.

14. The animal call of claim 13, further comprising a biasing element to position the base portion and pedal portion in the non-contact position.

15. The animal call of claim 13, wherein the first and second sound generating surfaces each comprise a plurality of protuberances projecting therefrom.

16. The animal call of claim 13, wherein the first call sound is an antler smash and the second call sound is an antler rattle.

17. The animal call of claim 13, wherein the second movement mode further comprising a moveable frame connected to the pedal portion, the moveable frame enabling the second movement mode in generally opposing directions along a slide axis, the second sound generating surface being connected to the moveable frame for movement therewith.

18. The animal call of claim 14, wherein the moveable portion is biased to a neutral position and configured for movement in generally opposing first and second directions about the neutral position, movement in the first direction from the neutral position being the first movement mode, movement in the second direction from the neutral position actuating a third animal call.

19. The antler rattling apparatus of claim 18, wherein the third animal call is a deer grunt.

20. The animal call of claim 13, wherein the base portion and pedal portion each include a receptacle for receiving respective first and second sound plates enabling the first and second sound plates to be selectively removed.

* * * * *